United States Patent
Kim et al.

(10) Patent No.: US 11,991,486 B2
(45) Date of Patent: May 21, 2024

(54) COLOR TRANSFORM METHOD, ELECTRONIC DEVICE FOR PERFORMING THE METHOD, AND IMAGE SENSOR

(71) Applicant: Samsung Electronics Co., Ltd., Suwon-si (KR)

(72) Inventors: Geonwoo Kim, Suwon-si (KR); Sung Kwang Cho, Seoul (KR); Yang Ho Cho, Seongnam-si (KR); Dong Kyung Nam, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 270 days.

(21) Appl. No.: 17/688,247

(22) Filed: Mar. 7, 2022

(65) Prior Publication Data
US 2023/0080942 A1 Mar. 16, 2023

(30) Foreign Application Priority Data
Sep. 10, 2021 (KR) .......................... 10-2021-0121115

(51) Int. Cl.
H04N 9/64 (2023.01)
(52) U.S. Cl.
CPC ..................... *H04N 9/64* (2013.01)
(58) Field of Classification Search
CPC .......... H04N 9/646; H04N 9/64; H04N 23/85; H04N 9/67; H04N 25/60; H04N 25/67; H04N 25/677; H04N 1/58
See application file for complete search history.

(56) References Cited

U.S. PATENT DOCUMENTS

| | | | |
|---|---|---|---|
| 6,825,876 B1 | 11/2004 | Easwar et al. | |
| 7,009,652 B1 | 3/2006 | Tanida et al. | |
| 7,412,107 B2 | 8/2008 | Milanfar et al. | |
| 7,512,264 B2 * | 3/2009 | Pollard ................... | H04N 1/58 |
| | | | 382/162 |
| 7,724,439 B2 | 5/2010 | Li et al. | |
| 7,940,282 B2 | 5/2011 | Milanfar et al. | |
| 8,237,841 B2 | 8/2012 | Tanida et al. | |

(Continued)

FOREIGN PATENT DOCUMENTS

| | | |
|---|---|---|
| CN | 103996178 A | 8/2014 |
| JP | 2003-224732 A | 8/2003 |

(Continued)

OTHER PUBLICATIONS

Takahashi, Kenta, et al. "Effective color correction pipeline for a noisy image." *IEEE International Conference on Image Processing ICIP*, 2016 (5 pages in English).

*Primary Examiner* — Nicholas G Giles
(74) *Attorney, Agent, or Firm* — NSIP Law (57) ABSTRACT

Disclosed is a color transform method performed by an electronic device that includes generating an initial color transformed image by performing color transform on a raw image, determine noise amplification degrees indicating degrees to which noise included in the raw image is amplified by the color transform, processing the determined noise amplification degrees, and generating a final color transformed image by filtering the generated initial color transformed image using the processed noise amplification degrees and at least one of the raw image or luminance information of the raw image.

20 Claims, 6 Drawing Sheets

(56) References Cited

U.S. PATENT DOCUMENTS

| | | |
|---|---|---|
| 9,485,397 B2 | 11/2016 | Rudmann et al. |
| 10,187,627 B2 | 1/2019 | Cho et al. |
| 2005/0286798 A1* | 12/2005 | Pollard .................... H04N 1/58 386/E9.006 |
| 2017/0078568 A1 | 3/2017 | Venkataraman et al. |
| 2017/0111558 A1 | 4/2017 | Brueckner et al. |

FOREIGN PATENT DOCUMENTS

| | | |
|---|---|---|
| JP | 6102592 B2 | 3/2017 |
| KR | 10-2007-0070251 A | 7/2007 |
| KR | 10-2019-0053074 A | 5/2019 |
| KR | 10-2019-0060441 A | 6/2019 |
| KR | 10-2021-0051242 A | 5/2021 |
| KR | 10-2021-0081767 A | 7/2021 |

\* cited by examiner

COLOR TRANSFORM METHOD, ELECTRONIC DEVICE FOR PERFORMING THE METHOD, AND IMAGE SENSOR

CROSS-REFERENCE TO RELATED APPLICATIONS

This application claims the benefit under 35 USC § 119(a) of Korean Patent Application No. 10-2021-0121115, filed on Sep. 10, 2021, in the Korean Intellectual Property Office, the entire disclosure of which is incorporated herein by reference for all purposes.

BACKGROUND

1. Field

The following description relates to a color transform method, an electronic device for performing the method, and an image sensor.

2. Description of Related Art

Linear transform, a non-linear function, a look-up table (LUT), and the like may be used to convert a raw color of an image sensor to a standard color. When a raw color is converted to a standard color, noise contained in the raw color may be amplified.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a color transform method performed by an electronic device, the color transform method including generating an initial color transformed image by performing color transform on a raw image, determining noise amplification degrees corresponding to a noise amplification degree for a first color value in a color space of the raw image based on a first transformed color value obtained by color transform on the first color value, and second transformed color values obtained by color transform on neighboring color values of the first color value, or determining a noise amplification degree for a color value of a first pixel in the raw image based on the color value of the first pixel, color values of neighboring pixels of the first pixel, a third transformed color value obtained by color transform on the color value of the first pixel, and fourth transformed color values obtained by color transform on the color values of the neighboring pixels, processing the determined noise amplification degrees, and generating a final color transformed image by filtering the initial color transformed image using the processed noise amplification degrees and at least one of the raw image or luminance information of the raw image.

The neighboring color values may be apart from the first color value by a first distance in different axial directions in the color space, and wherein the determining of the noise amplification degree for the first color value may include calculating differences between the first transformed color value and the second transformed color values, and determining the noise amplification degree for the first color value using the calculated differences and the first distance.

The determining of the noise amplification degree for the first color value using the calculated differences and the first distance value may include calculating norms of the calculated differences, calculating ratios between the first distance and the calculated norms, and determining a mean of the calculated ratios to be the noise amplification degree for the first color value.

The processing may include normalizing the determined noise amplification degrees, applying a first function to the normalized noise amplification degrees to bring the normalized noise amplification degrees within a range, and applying a second function to a result of applying the first function.

The determining of the noise amplification degree for the first color value may include calculating the noise amplification degree for the first color value by applying a Jacobian determinant of a color transform function used for the color transform to the first color value, in response to a number of color dimensions of the raw image being equal to a number of color dimensions of the generated initial color transformed image.

The determining of the noise amplification degree for the color value of the first pixel may include calculating first norms of differences between the color value of the first pixel and the color values of the neighboring pixels, calculating second norms of differences between the third transformed color value and the fourth transformed color values, and determining the noise amplification degree for the color value of the first pixel using the calculated first norms and the calculated second norms.

The generating of the final color transformed image may include applying the processed noise amplification degrees to a guide image filter, and performing guide image filtering on the initial color transformed image using at least one of the raw image or the luminance information as a guide image of the guide image filter.

The applying of the processed noise amplification degrees may include applying the processed noise amplification degrees to a first coefficient of the guide image filter to adjust a value of the first coefficient by colors.

In another general aspect, there is provided an electronic device, including an image sensor configured to capture a raw image, and a processor configured to receive the raw image from the image sensor, preprocess the raw image, generate an initial color transformed image by performing color transform on the preprocessed raw image, determine noise amplification degrees indicating degrees to which noise included in the preprocessed raw image is amplified by the color transform, process the determined noise amplification degrees, and generate a final color transformed image by filtering the generated initial color transformed image using the processed noise amplification degrees and at least one of the preprocessed raw image or luminance information of the preprocessed raw image, wherein the processor is further configured to determine a noise amplification degree for a first color value in a color space of the preprocessed raw image based on a first transformed color value obtained by color transform on the first color value and second transformed color values obtained by color transform on neighboring color values of the first color value, or determine a noise amplification degree for a color value of a first pixel in the preprocessed raw image based on the color value of the first pixel, color values of neighboring pixels of the first pixel, a third transformed color value obtained by color transform on the color value of the first pixel, and fourth transformed color values obtained by color transform on the color values of the neighboring pixels.

The neighboring color values may be apart from the first color value by a first distance in different axial directions in the color space, and the processor may be configured to calculate differences between the first transformed color value and the second transformed color values, and to determine the noise amplification degree for the first color value using the calculated differences and the first distance.

The processor may be configured to calculate norms of the calculated differences, calculate ratios between the first distance and the calculated norms, and to determine a mean of the calculated ratios to be the noise amplification degree for the first color value.

The processor may be configured to normalize the determined noise amplification degrees, to apply a first function to the normalized noise amplification degrees to bring the normalized noise amplification degrees within a range, and to apply a second function to a result of applying the first function.

The processor may be configured to calculate the noise amplification degree for the first color value by applying a Jacobian determinant of a color transform function used for the color transform to the first color value, in response to a number of color dimensions of the preprocessed raw image being equal to a number of color dimensions of the generated initial color transformed image.

The processor may be configured to calculate first norms of differences between the color value of the first pixel and the color values of the neighboring pixels, to calculate second norms of differences between the third transformed color value and the fourth transformed color values, and to determine the noise amplification degree for the color value of the first pixel using the calculated first norms and the calculated second norms.

The processor may be configured to apply the processed noise amplification degrees to a guide image filter, and to perform guide image filtering on the initial color transformed image using at least one of the raw image or the luminance information as a guide image of the guide image filter.

The processor may be configured to apply the processed noise amplification degrees to a first coefficient of the guide image filter to adjust a value of the first coefficient by colors.

In another general aspect, there is provided an image sensor, including a lens configured to capture a raw image, a color filter corresponding to the lens, and a control circuit configured to preprocess the raw image passing through the color filter, generate an initial color transformed image by performing color transform on the preprocessed raw image, determine noise amplification degrees indicating degrees to which noise included in the preprocessed raw image is amplified by the color transform, process the determined noise amplification degrees, and generate a final color transformed image by filtering the generated initial color transformed image using the processed noise amplification degrees and at least one of the preprocessed raw image or luminance information of the preprocessed raw image, wherein the control circuit is further configured to determine a noise amplification degree for a first color value in a color space of the preprocessed raw image based on a first transformed color value obtained by color transform on the first color value and second transformed color values obtained by color transform on neighboring color values of the first color value, or determine a noise amplification degree for a color value of a first pixel in the preprocessed raw image based on the color value of the first pixel, color values of neighboring pixels of the first pixel, a third transformed color value obtained by color transform on the color value of the first pixel, and fourth transformed color values obtained by color transform on the color values of the neighboring pixels.

The neighboring color values may be apart from the first color value by a first distance value in different axial directions in the color space, and the control circuit may be configured to calculate differences between the first transformed color value and the second transformed color values, and to determine the noise amplification degree for the first color value using the calculated differences and the first distance value.

The control circuit may be configured to calculate first norms of differences between the color value of the first pixel and the color values of the neighboring pixels, to calculate second norms of differences between the third transformed color value and the fourth transformed color values, and to determine the noise amplification degree for the color value of the first pixel using the first norms and the second norms.

The control circuit may be configured to apply the processed noise amplification degrees to a guide image filter, and to perform guide image filtering on the generated initial color transformed image using at least one of the raw image or the luminance information as a guide image of the guide image filter.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or populations thereof.

The use of the term "may" herein with respect to an example or embodiment (e.g., as to what an example or embodiment may include or implement) means that at least one example or embodiment exists where such a feature is included or implemented, while all examples are not limited thereto.

Hereinafter, examples will be described in detail with reference to the accompanying drawings. When describing the examples with reference to the accompanying drawings, like reference numerals refer to like elements and a repeated description related thereto will be omitted.

Figure 1:
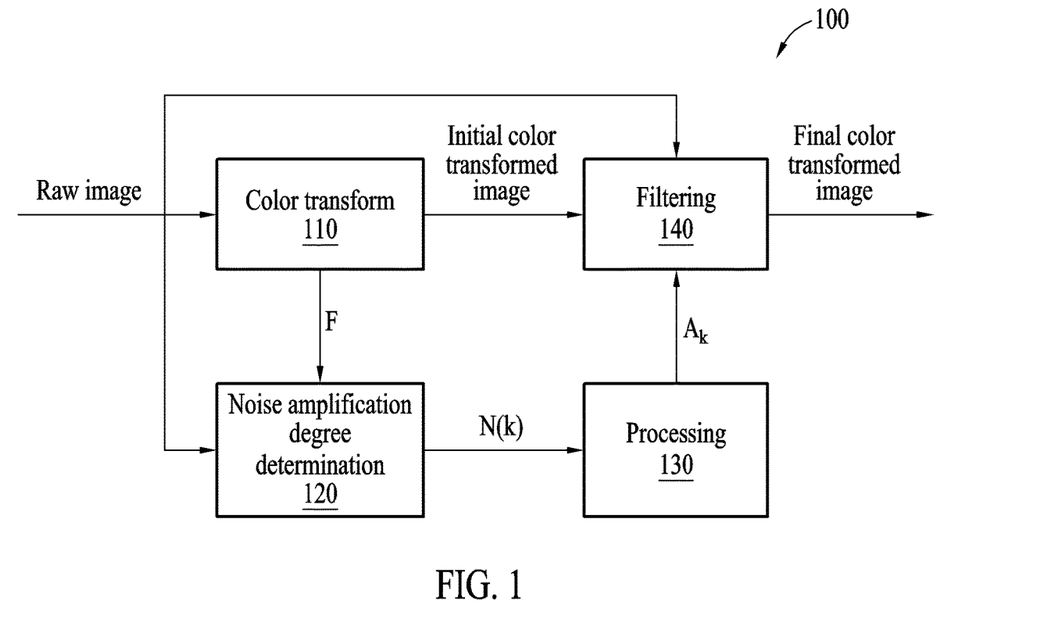
FIG. 1 illustrates an example of a color transform method of a color transform apparatus.

FIG. 1 illustrates an example of a color transform method of a color transform apparatus.

A color transform apparatus 100 may perform color transform on a raw image from an image sensor, and quantify noise amplified by the color transform. The color transform apparatus 100 may filter (or denoise) the color-transformed image, and may filter (or denoise) the color-transformed image when the raw image has a signal-to-noise ratio (SNR) higher than that of the color-transformed image and the amplified noise. Hereinafter, the operation of the color transform apparatus 100 will be described in detail.

Referring to FIG. 1, the color transform apparatus 100 may generate an initial color transformed image by performing color transform 110 on a raw image. For example, the color transform apparatus 100 may receive the raw image (e.g., a CMY raw image) from an image sensor including a color filter (e.g., a complementary color filter, an RGB color filter, etc.). The color transform apparatus 100 may generate the initial color transformed image by performing the color transform 110 on the raw image.

The initial color transformed image may be, for example, an image of a standard color spectrum (or standard color space). A standard color may include, for example, Standard RGB (sRGB), CIEXYZ, and the like, but is not limited thereto.

In an example, the color transform apparatus 100 may perform the color transform 110 on the raw image using a linear function, a non-linear function, or a look-up table (LUT).

When a color filter spectrum of the image sensor is different from the standard color spectrum, a noise component included in the raw image may be amplified by the color transform 110. For example, noise may be amplified for each color (in other words, each color value) of the raw image by color transform. For each color, the degree to which noise is amplified may be different.

In noise amplification degree determination 120, the color transform apparatus 100 may determine a noise amplification degree indicating the degree to which noise is amplified for each color of the raw image by the color transform. In other words, the color transform apparatus 100 may quantify the noise amplification degree for each color. A method of determining the noise amplification degree by the color transform apparatus 100 will be described in detail with reference to FIGS. 2 and 3.

In processing 130, the color transform apparatus 100 may process the noise amplification degree for each color. As will be described later, the color transform apparatus 100 may normalize the noise amplification degree for each color, apply a first function (e.g., tanh function) to each normalized noise amplification degree, and apply a second function (e.g., exponential function) to a result of applying the first function.

The color transform apparatus 100 may perform filtering 140 on the initial color transformed image using the raw image (or luminance information of the raw image) and the processed noise amplification degree $A_k$. Filtering 140 may include, for example, guided image filtering (GIF), but is not limited to. As an example, the color transform apparatus 100 may use the raw image as a guide image of GIF and apply the processed noise amplification degree $A_k$ to GIF. In an example, the raw image may be demosaiced, and the demosaiced raw image may be used as the guide image. The color transform apparatus 100 may perform GIF on the initial color transformed image. As another example, the color transform apparatus 100 may use luminance information of the raw image as a guide image of GIF. More specifically, the color transform apparatus 100 may determine the luminance information L of the raw image through Equation 1 below for the raw image.

$$L = c_1 \cdot S_1 + c_2 \cdot S_2 + c_3 \cdot S_3 \ldots = \sum_{i=1}^{n} c_i \cdot S_i \quad \text{[Equation 1]}$$

In Equation 1 above, n denotes the number of color channels, $S_i$ denotes raw data of a color channel i, and $c_i$ denotes a weight. The sum of weights may be "1". As an example, in the case of CMY, n is "3", and $S_1$, $S_2$, and $S_3$ denote raw data of a channel C, raw data of a channel M, and raw data of a channel Y, respectively. Weights may be determined by modeling a relationship between characteristics of a CMY color spectrum and Y spectral characteristics of YCbCr. As another example, in the case of RGB, n is "3", and $S_1$, $S_2$, and $S_3$ denote raw data of a channel R, raw data of a channel G, and raw data of a channel B, respectively. Weights may be determined by modeling a relationship between characteristics of an RGB color spectrum and Y spectral characteristics of CIEXYZ. In the case of RGB, for example, $c_1$ may be 0.212, $c_2$ may be 0.715, and $c_3$ may be 0.072. The color transform apparatus 100 may use the luminance information of the raw image as a guide image and apply the processed noise amplification degree $A_k$ to GIF. The color transform apparatus 100 may perform GIF on the initial color transformed image.

The color transform apparatus 100 may generate a final color transformed image in which noise is mitigated (or removed) by performing filtering 140.

Figure 2:
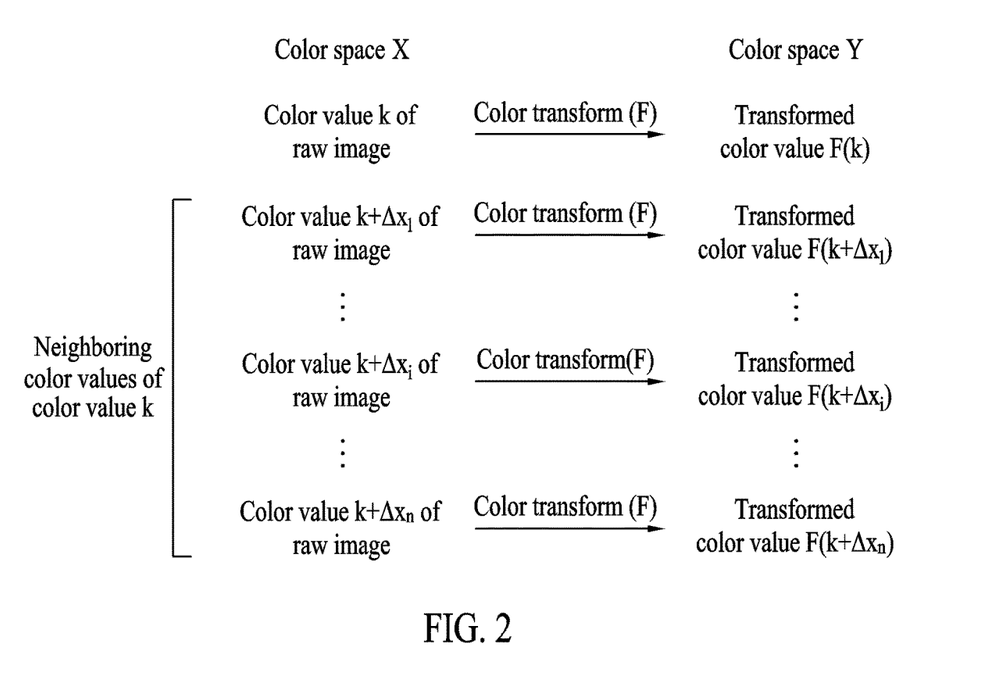
FIGS. 2 and 3 illustrate examples of determining a noise amplification degree.
Figure 3:
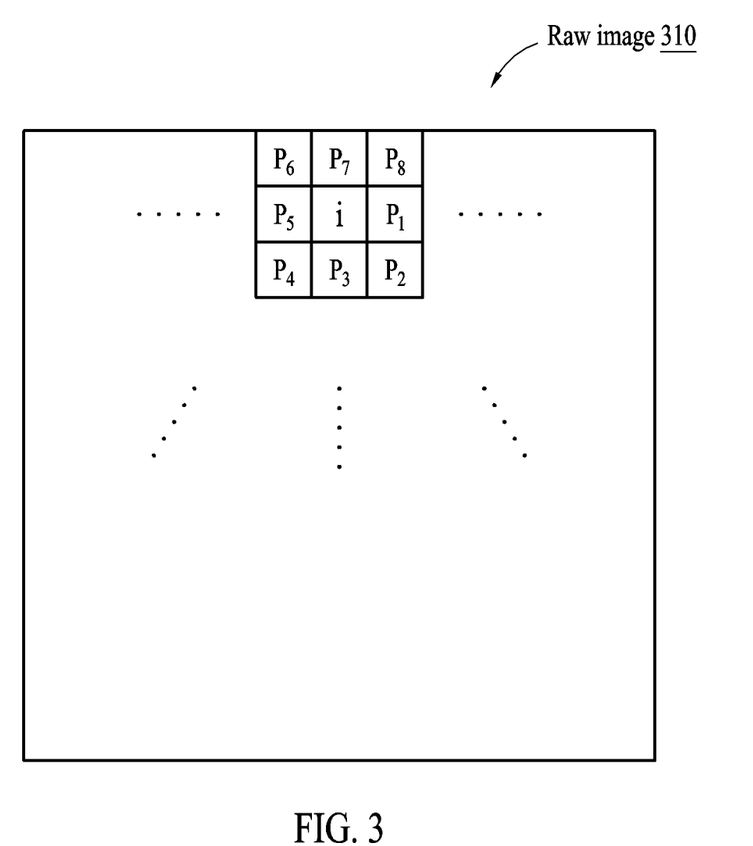

FIGS. 2 and 3 illustrate examples of determining a noise amplification degree.

An example of determining (or quantifying) a noise amplification degree for a color value in color space by the color transform apparatus 100 will be described with reference to FIG. 2.

Referring to FIG. 2, the color transform apparatus 100 may generate a transformed color value F(k) by performing color transform F on a color value k of a raw image. Similarly, the color transform apparatus 100 may generate transformed color values $F(k+\Delta x_1)$, $F(k+\Delta x_i)$, $F(k+\Delta x_n)$ by performing color transform on color values $k+\Delta x_1$, ..., $k+\Delta x_i$, ..., $k+\Delta x_n$.

In FIG. 2, the color value k may be coordinates in color space X (i.e., color space of the raw image). For example, when the color space X is CMY color space, the color value k may be (C value, M value, Y value).

$\Delta x_i$ may be a vector having a small constant value α in an i-axial direction in the color space X. $\Delta x_i = (0, ..., α, ..., 0)$. The i-axis may correspond to, for example, the C-axis, the M-axis, or the Y-axis when the color space X is CMY color space.

In FIG. 2, the color value $k+\Delta x_i$ of the raw image may be a color value apart from the color value k by $\Delta x_1$ in the i-axial direction in the color space X. For i=1 (e.g., when the i-axis is the C-axis), the color value $k+\Delta x_1$ may be a color value apart from the color value k by a constant value α along the C-axis.

Each of the color values $k+\Delta x_1$, ..., $k+\Delta x_i$, ..., $k+\Delta x_n$ may be expressed as a neighboring color value of the color value k.

In FIG. 2, the color space Y may be standard color space, and the transformed color values F(k), $F(k+\Delta x_1)$, ..., $F(k+\Delta x_i)$, ..., $F(k+\Delta x_n)$ may correspond to standard colors.

The color transform apparatus 100 may calculate a noise amplification degree for the color value k based on $\Delta x_i$ and differences between the transformed color value F(k) and the transformed color values $F(k+\Delta x_1)$, ..., $F(k+\Delta x_i)$, ..., $F(k+\Delta x_n)$. As an example, the color transform apparatus 100 may calculate the noise amplification degree for the color value k according to Equation 2 below.

$$\frac{1}{n}\left(\sum_{j=1}^{n} \frac{\|F(k+\Delta x_i) - F(k)\|}{\|\Delta x_i\|}\right) \quad [\text{Equation 2}]$$

In Equation 2 above, $\|\cdot\|$ denotes a Euclidean norm.

The color transform apparatus 100 may calculate norms for the differences between the transformed color value F(k) and the transformed color values $F(k+\Delta x_1)$, ..., $F(k+\Delta x_i)$, ..., $F(k+\Delta x_n)$ through Equation 2 above, and calculate ratios between the calculated norms and a norm of $\Delta x_i$. The norm of $\Delta x_i$ may be the aforementioned constant value α, and thus, the color transform apparatus 100 may calculate ratios between the constant value α and the calculated norms. The color transform apparatus 100 may determine a mean of the calculated ratios to be the noise amplification degree N(k) for the color value k. Similarly, the color transform apparatus 100 may calculate noise amplification degrees for the remaining color values of the raw image. Accordingly, the color transform apparatus 100 may quantify the noise amplification degree for each color.

In another example of determining the noise amplification degree for each color, the color transform apparatus 100 may calculate the noise amplification degree for each color value of the raw image through a Jacobian determinant when the number of dimensions of the color space X is the same as the number of dimensions of the color space Y. As an example, the color space X may be CMY color space, and the color space Y may be RGB color space. In this case, the color space X and the color space Y are of three dimensions and have the same number of dimensions. When the color transform apparatus 100 performs color transform on the raw image, the noise amplification degree may differ for each color. The color transform apparatus 100 may use the Jacobian determinant to quantify the noise amplification degree that differs for each color. The color transform apparatus 100 may calculate the noise amplification degree of each color value of the raw image through the Jacobian determinant. Equation 3 below shows JF(k), a result of applying the color value k to the Jacobian determinant. In other words, Equation 3 below may represent a result of the Jacobian determinant for the color value k.

$$JF(k) = \begin{vmatrix} \frac{dF_1}{dx_1}(k) & \frac{dF_2}{dx_1}(k) & \frac{dF_3}{dx_1}(k) \\ \frac{dF_1}{dx_2}(k) & \frac{dF_2}{dx_2}(k) & \frac{dF_3}{dx_2}(k) \\ \frac{dF_1}{dx_3}(k) & \frac{dF_2}{dx_3}(k) & \frac{dF_3}{dx_3}(k) \end{vmatrix} \quad [\text{Equation 3}]$$

The color transform apparatus 100 may determine JF(k) of Equation 3 above to be the noise amplification degree of the color value k. Similarly, the color transform apparatus 100 may calculate noise amplification degrees for the remaining color values of the raw image using the Jacobian determinant.

In another example of determining the noise amplification degree for each color, the color transform apparatus 100 may divide the color space X into grids (either uniform grids or non-uniform grids), and calculate the noise amplification degree for each color value corresponding to a representative grid of the color space X divided into grids. Here, the representative grid may be a grid including some grid points (or some color values) in the color space X divided into grids. The color transform apparatus 100 may generate a LUT by using each color value on the representative grid. Upon receiving the raw image, the color transform apparatus 100 may determine the noise amplification degree for each color value of the raw image through the generated LUT. When the raw image has a color value that is not in the LUT, the color transform apparatus 100 may calculate a noise amplification degree for the corresponding color value through an interpolation operation.

An example of determining (or quantifying) a noise amplification degree in view of a pixel and neighboring pixels of a raw image 310 by the color transform apparatus 100 will be described with reference to FIG. 3.

An example of the raw image 310 is shown in FIG. 3. The raw image 310 may include a plurality of pixels. In the raw image 310, pixels $p_1$ to $p_8$ may be neighboring pixels (or ambient pixels) of a pixel i.

The color transform apparatus 100 may generate a transformed color value F(I(i)) by performing color transform F on a color value I(i) of the pixel i. Similarly, the color transform apparatus 100 may generate transformed color values $F(I(p_1))$ to $F(I(p_8))$ by performing color transform F on color values $I(p_1)$ to $I(p_8)$ of the neighboring pixels $p_1$ to $p_8$.

The color transform apparatus 100 may determine (or calculate) a noise amplification degree for the color value I(i) of the pixel i using the color value I(i) of the pixel i, the color values $I(p_1)$ to $I(p_8)$ of the neighboring pixels $p_1$ to $p_8$, and the transformed color values F(I(i)) and $F(I(p_1))$ to $F(I(p_8))$. For example, the color transform apparatus 100 may calculate the noise amplification degree for the color value I(i) of the pixel i through Equation 4 below.

$$\frac{1}{|\omega_i|} \sum_{p \in \omega_i} \frac{\|F(I(p)) - F(I(i))\|}{\|(I(p)) - (I(i))\|} \qquad \text{[Equation 4]}$$

In Equation 4 above, $\omega_i$ denotes a set of the neighboring pixels $p_1$ to $p_8$ of the pixel i.

The color transform apparatus 100 may calculate differences between the color value I(i) and the color values $I(p_1)$ to $I(p_8)$, and calculate first norms of the calculated differences. The color transform apparatus 100 may calculate differences between the transformed color value F(I(i)) and the transformed color values $F(I(p_1))$ to $F(I(p_8))$, and calculate second norms of the calculated differences. The color transform apparatus 100 may calculate a noise amplification degree N(k) for the color value I(i) through the calculated first norms and the calculated second norms. Similarly, the color transform apparatus 100 may calculate noise amplification degrees for color values of the remaining pixels of the raw image 310.

Figure 4:
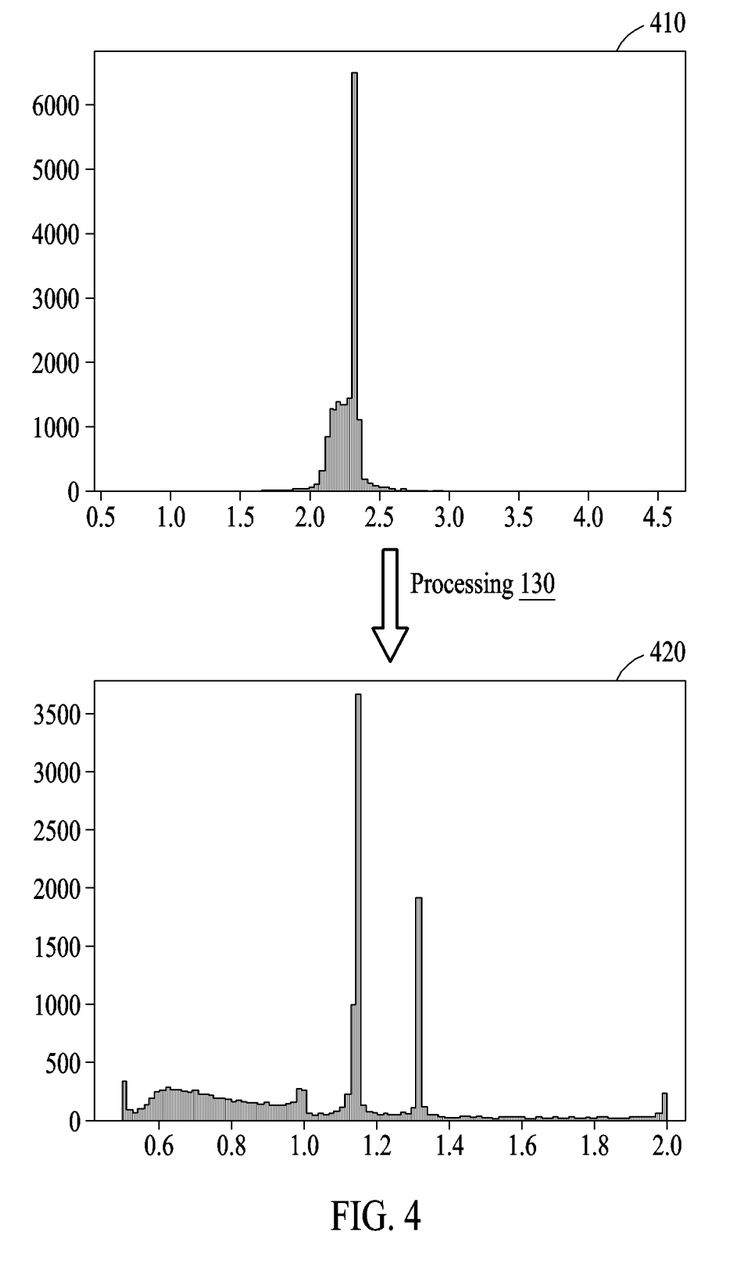
FIG. 4 illustrates an example of processing a noise amplification degree.

FIG. 4 illustrates an example of processing a noise amplification degree.

In an example, the color transform apparatus 100 may normalize noise amplification degrees for respective colors through Equation 5 below so that a distribution of the noise amplification degrees for the respective colors has a mean of "0" and a standard deviation of "1".

$$\tilde{N}(k) = \frac{N(k) - m_N}{\sigma_N} \qquad \text{[Equation 5]}$$

In Equation 5 above, $\tilde{N}(k)$ denotes a normalized noise amplification degree for a color value k, N(k) denotes a noise amplification for the color value k, mN denotes the mean of the noise amplification degrees for the respective colors, and σN denotes the standard deviation of the noise amplification degrees for the respective colors.

The color transform apparatus 100 may transform $\tilde{N}(k)$ using a hyperbolic tangent (tanh) function and an exponential function $a^x$. For example, the color transform apparatus 100 may apply tanh to $\tilde{N}(k)$ so that $\tilde{N}(k)$ is limited to "−1" to "1", and apply $\tanh(\tilde{N}(k))$ to the exponential function $a^x$ as shown in Equation 6 below.

$$A_k = a^{tanh(\tilde{N}(k))} \qquad \text{[Equation 6]}$$

In Equation 6 above, $A_k$ denotes a processed noise amplification degree of the color value k.

$A_k$ may be a factor that adjusts a value of the coefficient $a_k$ of GIF in filtering 140, which will be described later. In other words, $A_k$ may be a factor that adjusts a filtering strength (or denoising strength) for the color k. Accordingly, processing 130 described with reference to FIG. 4 may include quantification of the filtering strength.

Histograms are shown in FIG. 4, wherein a histogram 410 is a histogram of JF(k) in Equation 2 above, and a histogram 420 is a histogram of $A_k$ determined through Equations 7 and 8 below.

$$\tilde{JF}(k) = \frac{|JF(k)| - m_{JF}}{\sigma_{JF}} \qquad \text{[Equation 7]}$$

$$A_k = a^{tanh(\tilde{JF}(k))} \qquad \text{[Equation 8]}$$

In Equation 7 above, $m_{JF}$ and $\sigma_{JF}$ denote a mean and a standard deviation of values of Jacobian determinants of respective color values of a raw image, respectively.

The color transform apparatus 100 may apply the processed noise amplification degree $A_k$ for each color to filtering 140.

Figure 5:
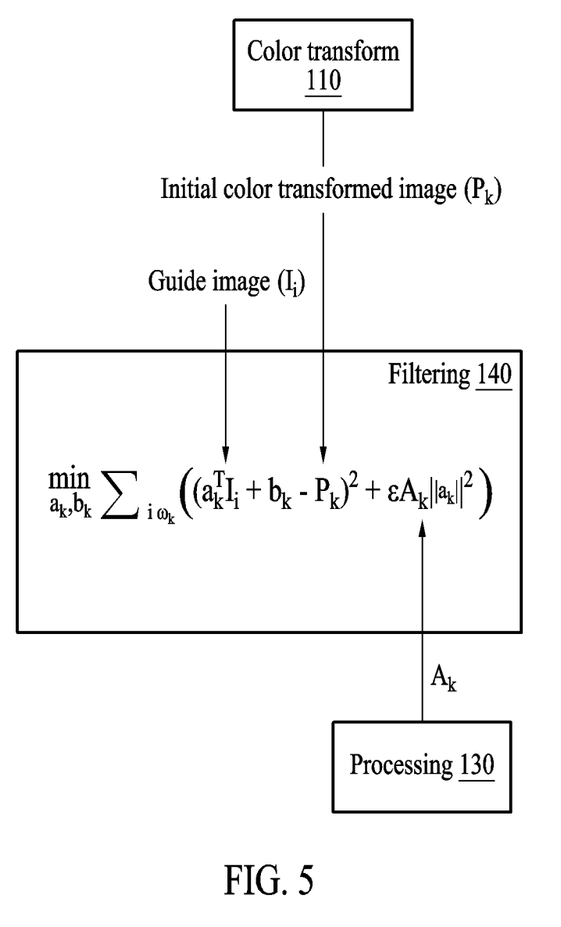
FIG. 5 illustrates an example of filtering.

FIG. 5 illustrates an example of filtering.

Referring to FIG. 5, filtering 140 may include GIF, but is not limited thereto.

The color transform apparatus 100 may perform GIF on an initial color transformed image $P_k$ using a guide image $I_i$ and a processed noise amplification degree $A_k$.

The color transform apparatus 100 may filter the initial color transformed image $P_k$ by solving a minimization problem of Equation 9 below. The color transform apparatus 100 may use the raw image as a guide image for GIF, and apply $A_k$ to a linear filter coefficient $a_k$ for GIF. The color transform apparatus 100 may perform filtering differently for each color k.

$$\min_{a_k, b_k} \sum_{i \in \omega_k} \left( (a_k^T I_i + b_k - P_k)^2 + \epsilon A_k \|a_k\|^2 \right) \qquad \text{[Equation 9]}$$

In Equation 9 above, $\omega_k$ denotes a set including neighboring color values of the color value k, and $a_k$ and $b_k$ denotes linear filter coefficients for GIF. If the guide image is n-dimensional, $a_k$ is an n-dimensional vector, and $b_k$ is a scalar value. For example, when a raw image of CMY color is a guide image, the raw image is of three dimensions, and $a_k$ is a three-dimensional vector.

When the guide image (i.e., raw image) is n-dimensional, the color transform apparatus 100 may calculate $a_k$ through Equation 10 below, and calculate $b_k$ through Equation 11 below.

$$a_k = \left( \sum_k + \epsilon A_k U \right)^{-1} \left( \frac{1}{|\omega_k|} \sum_{i \in \omega_k} I_i p_i - \mu_k \overline{p}_k \right) \qquad \text{[Equation 10]}$$

$$b_k = \overline{p}_k - a_k^T \mu_k \qquad \text{[Equation 11]}$$

In Equations 10 and 11, $\mu_k$ and $\sigma_k^2$ denote a mean and a variance of color values of the guide image (i.e., raw image), respectively. $\Sigma_k$ denotes an n×n covariance matrix in $\omega_k$ of the guide image, U denotes an n×n identity matrix, $\overline{p}_k$ denotes a mean value of the color values of the initial color transformed image, and ε denotes a regularization parameter.

The coefficients $a_k$ and $b_k$ for filtering may be determined according to the mean and variance of the color values of the guide image. In other words, it may be set to reflect characteristics of the guide image in a denoising result (or a final color transformed image).

$A_k$ may adjust a value of the linear filter coefficient $a_k$. The larger $A_k$, the smaller $a_k$. This may increase the role or weight of $b_k$ rather than making the guide image and the initial color transformed image be similar in $\omega_k$, so that denoising may be applied more strongly. The smaller $A_k$, the weaker denoising applied. In other words, the denoising strength may be adjusted according to the noise amplification degree (or $A_k$).

For example, when $A_1$ for a color value 1 is "1", the color transform apparatus 100 may perform filtering in a mean strength. When $A_2$ for a color value 2 is greater than $A_1$, the color transform apparatus 100 may perform filtering in a strength larger than the filtering strength of the color value 1. When $A_3$ for a color value 3 is less than $A_1$, the color transform apparatus 100 may perform filtering in a strength smaller than the filtering strength of the color value 1.

Depending on the implementation, the guide image may be 1-channel. For example, the guide image may be luminance information of the raw image. The color transform apparatus 100 may use the luminance information of the raw image as a guide image for GIF and perform filtering by solving the minimization problem of Equation 9 above. In this case, the color transform apparatus 100 may calculate $a_k$ through Equation 12 below, and calculate $b_k$ through Equation 13 below. When the guide image is 1-channel, $a_k$ and $b_k$ may be scalar values.

$$a_k = \frac{\frac{1}{|\omega_k|}\sum_{i \in \omega_k} I_i p_i - \mu_k \overline{p}_k}{\sigma_k^2 + \epsilon A_k} \quad \text{[Equation 12]}$$

$$b_k = \overline{p}_k - a_k \mu_k \quad \text{[Equation 13]}$$

In Equation 12 above, $I_i$ corresponds to the luminance information of the raw image.

The color transform apparatus 100 may generate a final color transformed image through filtering 140. The initial color transformed image may include noise amplified by color transform, and the color transform apparatus 100 may remove or mitigate the amplified noise through filtering 140. Further, the color transform apparatus 100 may cause the final color transformed image to follow an edge and a texture of a guide image (i.e., raw image or luminance information of the raw image) with a high SNR.

In another example, the color transform apparatus 100 may calculate a chrominance of the raw image. The color transform apparatus 100 may perform filtering 140 on the initial color transformed image using the luminance of the raw image, the chrominance of the raw image, and the processed noise amplification degrees. For example, the color transform apparatus 100 may filter a luminance of the initial color transformed image by referring to the luminance of the raw image, and filter a chrominance of the initial color transformed image by referring to the chrominance of the raw image. In this case, GIF to which the processed noise amplification degrees are applied may be used for filtering.

In another example, the color transform apparatus 100 may filter the chrominance of the initial color transformed image using the raw image and the processed noise amplification degrees, and generate the final color transformed image by replacing a luminance of the filtering result with the luminance of the raw image.

Figure 6:
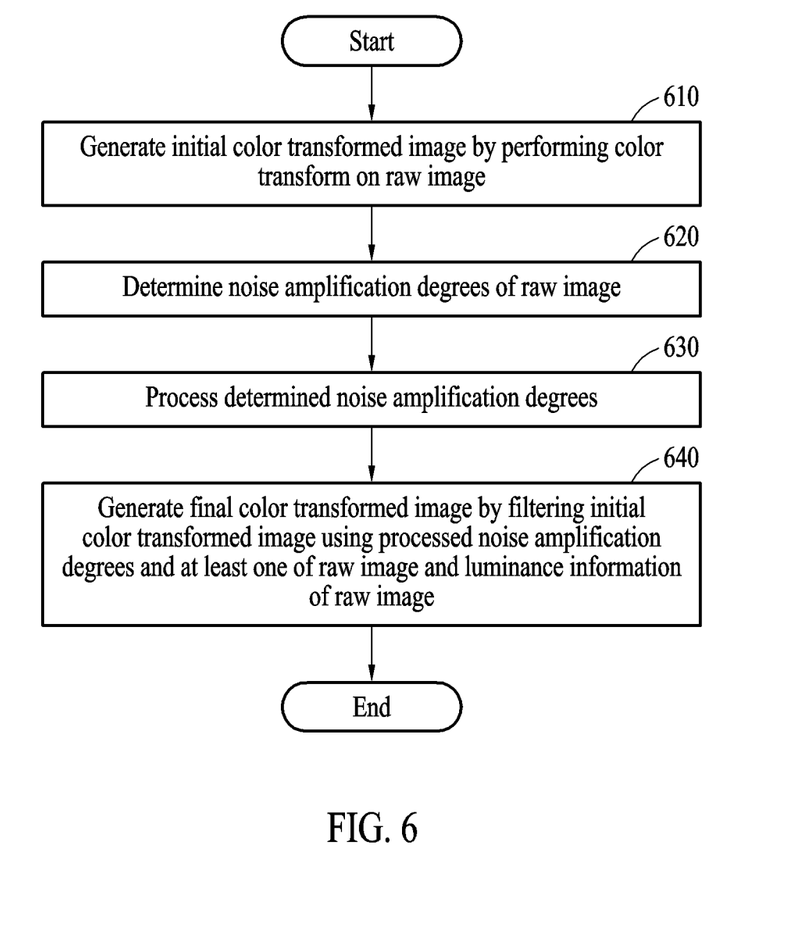
FIG. 6 illustrates an example of a color transform method.

FIG. 6 illustrates an example of a color transform method. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer, such as a processor, that perform the specified functions, or combinations of special purpose hardware and computer instructions.

Referring to FIG. 6, in operation 610, the color transform apparatus 100 may generate an initial color transformed image by performing color transform on a raw image.

In operation 620, the color transform apparatus 100 may determine noise amplification degrees of the raw image. The color transform apparatus 100 may determine a noise amplification degree for each color of the raw image.

Determining a noise amplification degree for a first color value of the raw image will be described. Determining the noise amplification degree for the first color value may be applied to determining noise amplification degrees for the other color values of the raw image.

In an example, the color transform apparatus 100 may determine the noise amplification degree for the first color value in a color space of the raw image based on a first transformed color value obtained by color transform on the first color value and second transformed color values obtained by color transform on neighboring color values of the first color value. Here, the neighboring color values of the first color value may be apart from the first color value by a first distance value (e.g., the constant value $\alpha$ described in FIG. 2) in different axial directions in the color space. For example, the color transform apparatus 100 may calculate differences between the first transformed color value and the second transformed color values. The color transform apparatus 100 may determine the noise amplification degree for the first color value using the calculated differences and the first distance value. In this case, the color transform apparatus 100 may calculate ratios between the first distance value and norms of the calculated differences, and determine a mean of the calculated ratios to be the noise amplification degree for the first color value. Since this has been described with reference to FIG. 2, a detailed description will be omitted here for conciseness.

In another example, the color transform apparatus 100 may calculate the noise amplification degree for the first color value by applying a Jacobian determinant of a color transform function used for the color transform to the first color value, in response to a number of color dimensions of the raw image being the same as a number of color dimensions of the initial color transformed image.

Determining a noise amplification degree for a color value of a first pixel of the raw image will be described. Determining the noise amplification degree for the color value of the first pixel may be applied to determining noise amplification degrees for color values of the other pixels of the raw image.

The color transform apparatus 100 may determine the noise amplification degree for the color value of the first pixel of the raw image based on the color value of the first pixel, color values of neighboring pixels of the first pixel, a third transformed color value obtained by color transform on the color value of the first pixel, and fourth transformed color values obtained by color transform on the color values of the neighboring pixels. For example, the color transform apparatus 100 may calculate first norms of differences between the color value of the first pixel and the color values of the neighboring pixels. The color transform apparatus 100 may calculate second norms of differences between the third transformed color value and the fourth transformed color values. The color transform apparatus 100 may determine the noise amplification degree for the color value of the first pixel using the calculated first norms and the calculated second norms. Since this has been described with reference to FIG. 3, a detailed description will be omitted here for conciseness.

In operation 630, the color transform apparatus 100 may process the determined noise amplification degrees. For example, the color transform apparatus 100 may normalize the determined noise amplification degrees. The color transform apparatus 100 may apply a first function (e.g., tanh) to the normalized noise amplification degrees so that the normalized noise amplification degrees are within a predetermined range (e.g., between "−1" and "1"). The color transform apparatus 100 may determine $A_k$ described with reference to FIG. 4 by applying a second function (e.g., exponential function) to a result of applying the first function.

In operation 640, the color transform apparatus 100 may generate a final color transformed image by filtering the initial color transformed image using the processed noise amplification degrees and at least one of the raw image and luminance information of the raw image.

In operation 640, the color transform apparatus 100 may apply the processed noise amplification degrees to a guide image filter. For example, the color transform apparatus 100 may apply the processed noise amplification degrees to a first coefficient (e.g., the linear filter coefficient $a_k$ described with reference to FIG. 5) of the guide image filter so that a value of the first coefficient of the guide image filter is adjusted for each color. The color transform apparatus 100 may perform GIF on the initial color transformed image using at least one of the raw image and the luminance information of the raw image as a guide image of the guide image filter. Since this has been described with reference to FIG. 5, a detailed description will be omitted here for conciseness.

The description provided with reference to FIGS. 1 through 5 also applies to the description of FIG. 6, and are incorporated herein by reference. Thus, a detailed description of FIGS. 1-5 will be omitted for conciseness.

Figure 7:
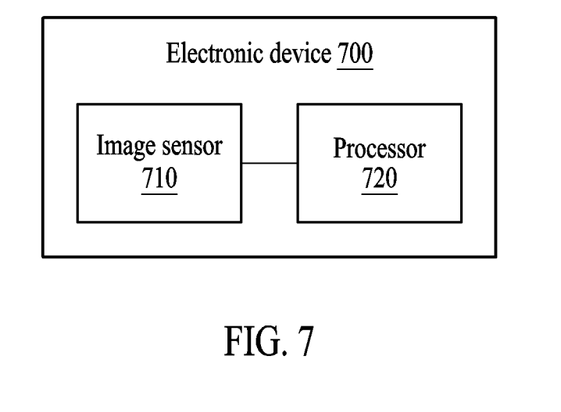
FIG. 7 illustrates an example of an electronic device.

FIG. 7 illustrates an example of an electronic device.

Referring to FIG. 7, an electronic device 700 includes an image sensor 710 and a processor 720.

The image sensor 710 may be a complementary metal-oxide-semiconductor (CMOS) image sensor.

The processor 720 may be an image signal processor (ISP).

The image sensor 710 may generate a raw image and transmit the raw image to the processor 720.

The processor 720 may perform preprocessing on the raw image. The preprocessing may include, for example, sensor image correction and demosaicing. The processor 720 may perform sensor image correction on the raw image to remove artifacts in the raw image. The sensor image correction may include, for example, bad pixel correction, lens shading correction, denoising, and the like, but is not limited thereto. The processor 720 may apply demosaicing to the raw image on which sensor image correction has been performed. Accordingly, the processor 720 may restore the color of the image on which the sensor image correction has been performed in full color.

The processor 720 may include the color transform apparatus 100, and may perform the color transform method described with reference to FIGS. 1 to 6.

More specifically, the processor 720 may generate an initial color transformed image by performing color transform on the preprocessed raw image, and determine noise amplification degrees indicating degrees to which noise included in the preprocessed raw image is amplified by color transform. As an example, the processor 720 may determine a noise amplification degree for a first color value in a color space of the raw image based on a first color transform value obtained by color transform on the first color value and second color transform values obtained by color transform on neighboring color values of the first color value. As another example, the processor 720 may determine a noise amplification degree for a color value of a first pixel in the preprocessed raw image based on the color value of the first pixel, color values of neighboring pixels of the first pixel, a third transformed color value obtained by color transform on the color value of the first pixel, and fourth transformed color values obtained by color transform on the color values of the neighboring pixels.

The processor 720 may process the determined noise amplification degrees, and filter the initial color transformed image using the processed noise amplification degrees and at least one of the preprocessed raw image and luminance information of the preprocessed raw image. Accordingly, the processor 720 may generate a final color transformed image.

The processor 720 may generate a final image by performing image processing on the final color transformed image. The image processing may include, for example, gamma correction, auto white balancing (AWB), deblurring, contrast enhancement, and the like, but is not limited thereto.

The processor 720 may store the final image in a memory (not shown) in the electronic device 700.

In an example, the electronic device 700 may include an auxiliary processor (e.g., a neural processor). The auxiliary processor may perform object recognition from a provided image. The processor 720 may transmit the final image to the auxiliary processor, and the auxiliary processor may perform object recognition on the final image and provide a user with a result of the object recognition.

The electronic device 700 may be implemented as a computer, an autonomous vehicle, a vehicle guidance device, a smartphone, a digital camera, a tablet PC, augmented reality (AR) glasses, or the like, but is not limited thereto.

The description provided with reference to FIGS. 1 to 6 also applies to the description of FIG. 7, and are incorporated herein by reference. Thus, a detailed description of FIGS. 1 to 6 will be omitted for conciseness.

Figure 8:
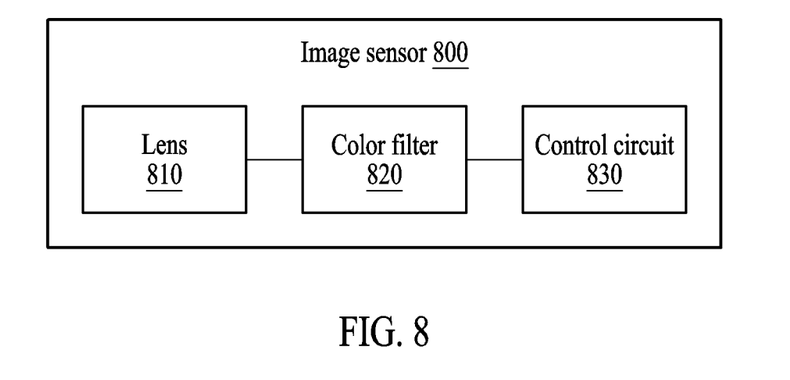
FIG. 8 illustrates an example of an image sensor.

FIG. 8 illustrates an example of an image sensor.

Referring to FIG. 8, an image sensor 800 includes a lens 810, a color filter 820 corresponding to the lens 810, and a control circuit 830.

The image sensor 800 may be a CMOS image sensor.

The color filter 820 may include a complementary color filter, but is not limited thereto.

The control circuit 830 may include an application-specific integrated circuit (ASIC) for performing the color transform method described above.

The control circuit 830 may perform preprocessing on the raw image passing through the color filter 820. The preprocessing may include, for example, sensor image correction and demosaicing. The control circuit 830 may perform sensor image correction on the raw image to remove artifacts in the raw image. The sensor image correction may include, for example, bad pixel correction, lens shading correction, denoising, and the like. The control circuit 830 may apply demosaicing to the raw image on which sensor image correction has been performed. Accordingly, the control circuit 830 may restore the color of the image on which the sensor image correction has been performed in full color.

The control circuit 830 may generate a final color transformed image by performing the color transform method described above on the preprocessed raw image. More specifically, the control circuit 830 may generate an initial color transformed image by performing color transform on the preprocessed raw image, and determine noise amplification degrees indicating degrees to which noise included in the preprocessed raw image is amplified by color transform. The control circuit 830 may process the determined noise amplification degrees, and filter the initial color transformed image using the processed noise amplification degrees and at least one of the preprocessed raw image and luminance information of the preprocessed raw image. Accordingly, the control circuit 830 may generate a final color transformed image.

The image sensor 800 may be included in an electronic device (not shown) (e.g., a smartphone, an autonomous vehicle, etc.), and the electronic device may include an ISP. When the ISP is capable of receiving a Bayer pattern image rather than a full-color image, the control circuit 830 may sample the final color transformed image in a Bayer pattern and transmit the sampled final color transformed image to the ISP. When the ISP is capable of receiving a full-color image, the control circuit 830 may transmit the final color transformed image to the ISP without sampling.

The configuration of the image sensor 800 is not limited to the example shown in FIG. 8. As an example, the image sensor 800 may include a small-size processor (for example: a microprocessor) and a memory. The small-sized processor may execute software stored in the memory to perform the preprocessing described with reference to FIG. 8 and the color transform method described with reference to FIGS. 1 to 6.

The description provided with reference to FIGS. 1 to 6 also applies to the description of FIG. 8, and thus a detailed description will be omitted for conciseness.

The apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

The instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the color transform method. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A color transform method performed by an electronic device, the color transform method comprising:
generating an initial color transformed image by performing color transform on a raw image;
determining noise amplification degrees corresponding to a noise amplification degree for a first color value in a color space of the raw image based on a first transformed color value obtained by color transform on the first color value, and second transformed color values obtained by color transform on neighboring color values of the first color value, or determining a noise amplification degree for a color value of a first pixel in the raw image based on the color value of the first pixel, color values of neighboring pixels of the first pixel, a third transformed color value obtained by color transform on the color value of the first pixel, and fourth transformed color values obtained by color transform on the color values of the neighboring pixels;
processing the determined noise amplification degrees; and
generating a final color transformed image by filtering the initial color transformed image using the processed noise amplification degrees and at least one of the raw image or luminance information of the raw image.

2. The color transform method of claim 1, wherein the neighboring color values are apart from the first color value by a first distance in different axial directions in the color space, and
wherein the determining of the noise amplification degree for the first color value comprises:
calculating differences between the first transformed color value and the second transformed color values; and
determining the noise amplification degree for the first color value using the calculated differences and the first distance.

3. The color transform method of claim 2, wherein the determining of the noise amplification degree for the first color value using the calculated differences and the first distance value comprises:
calculating norms of the calculated differences;
calculating ratios between the first distance and the calculated norms; and
determining a mean of the calculated ratios to be the noise amplification degree for the first color value.

4. The color transform method of claim 1, wherein the processing comprises:
normalizing the determined noise amplification degrees;
applying a first function to the normalized noise amplification degrees to bring the normalized noise amplification degrees within a range; and applying a second function to a result of applying the first function.

5. The color transform method of claim 1, wherein the determining of the noise amplification degree for the first color value comprises calculating the noise amplification degree for the first color value by applying a Jacobian determinant of a color transform function used for the color transform to the first color value, in response to a number of color dimensions of the raw image being equal to a number of color dimensions of the generated initial color transformed image.

6. The color transform method of claim 1, wherein the determining of the noise amplification degree for the color value of the first pixel comprises:
calculating first norms of differences between the color value of the first pixel and the color values of the neighboring pixels;
calculating second norms of differences between the third transformed color value and the fourth transformed color values; and
determining the noise amplification degree for the color value of the first pixel using the calculated first norms and the calculated second norms.

7. The color transform method of claim 1, wherein the generating of the final color transformed image comprises:
applying the processed noise amplification degrees to a guide image filter; and
performing guide image filtering on the initial color transformed image using at least one of the raw image or the luminance information as a guide image of the guide image filter.

8. The color transform method of claim 7, wherein the applying of the processed noise amplification degrees comprises applying the processed noise amplification degrees to a first coefficient of the guide image filter to adjust a value of the first coefficient by colors.

9. An electronic device, comprising:
an image sensor configured to capture a raw image; and
a processor configured to
receive the raw image from the image sensor,
preprocess the raw image,
generate an initial color transformed image by performing color transform on the preprocessed raw image,
determine noise amplification degrees indicating degrees to which noise included in the preprocessed raw image is amplified by the color transform,
process the determined noise amplification degrees, and
generate a final color transformed image by filtering the generated initial color transformed image using the processed noise amplification degrees and at least one of the preprocessed raw image or luminance information of the preprocessed raw image,
wherein the processor is further configured to
determine a noise amplification degree for a first color value in a color space of the preprocessed raw image based on a first transformed color value obtained by color transform on the first color value and second transformed color values obtained by color transform on neighboring color values of the first color value; or
determine a noise amplification degree for a color value of a first pixel in the preprocessed raw image based on the color value of the first pixel, color values of neighboring pixels of the first pixel, a third transformed color value obtained by color transform on the color value of the first pixel, and fourth transformed color values obtained by color transform on the color values of the neighboring pixels.

10. The electronic device of claim 9, wherein the neighboring color values are apart from the first color value by a first distance in different axial directions in the color space, and
the processor is further configured to calculate differences between the first transformed color value and the second transformed color values, and to determine the noise amplification degree for the first color value using the calculated differences and the first distance.

11. The electronic device of claim 10, wherein the processor is further configured to calculate norms of the calculated differences, calculate ratios between the first distance and the calculated norms, and to determine a mean of the calculated ratios to be the noise amplification degree for the first color value.

12. The electronic device of claim 9, wherein the processor is further configured to normalize the determined noise amplification degrees, to apply a first function to the normalized noise amplification degrees to bring the normalized noise amplification degrees within a range, and to apply a second function to a result of applying the first function.

13. The electronic device of claim 9, wherein the processor is further configured to calculate the noise amplification degree for the first color value by applying a Jacobian determinant of a color transform function used for the color transform to the first color value, in response to a number of color dimensions of the preprocessed raw image being equal to a number of color dimensions of the generated initial color transformed image.

14. The electronic device of claim 9, wherein the processor is further configured to calculate first norms of differences between the color value of the first pixel and the color values of the neighboring pixels, to calculate second norms of differences between the third transformed color value and the fourth transformed color values, and to determine the noise amplification degree for the color value of the first pixel using the calculated first norms and the calculated second norms.

15. The electronic device of claim 9, wherein the processor is further configured to apply the processed noise amplification degrees to a guide image filter, and to perform guide image filtering on the initial color transformed image using at least one of the raw image or the luminance information as a guide image of the guide image filter.

16. The electronic device of claim 15, wherein the processor is further configured to apply the processed noise amplification degrees to a first coefficient of the guide image filter to adjust a value of the first coefficient by colors.

17. An image sensor, comprising:
a lens configured to capture a raw image;
a color filter corresponding to the lens; and
a control circuit configured to
preprocess the raw image passing through the color filter, generate an initial color transformed image by performing color transform on the preprocessed raw image,
determine noise amplification degrees indicating degrees to which noise included in the preprocessed raw image is amplified by the color transform,
process the determined noise amplification degrees, and
generate a final color transformed image by filtering the generated initial color transformed image using the processed noise amplification degrees and at least one of the preprocessed raw image or luminance information of the preprocessed raw image,
wherein the control circuit is further configured to
determine a noise amplification degree for a first color value in a color space of the preprocessed raw image based on a first transformed color value obtained by color transform on the first color value and second transformed color values obtained by color transform on neighboring color values of the first color value; or
determine a noise amplification degree for a color value of a first pixel in the preprocessed raw image based on the color value of the first pixel, color values of neighboring pixels of the first pixel, a third transformed color value obtained by color transform on the color value of the first pixel, and fourth transformed color values obtained by color transform on the color values of the neighboring pixels.

18. The image sensor of claim 17, wherein the neighboring color values are apart from the first color value by a first distance value in different axial directions in the color space, and the control circuit is further configured to calculate differences between the first transformed color value and the second transformed color values, and to determine the noise amplification degree for the first color value using the calculated differences and the first distance value.

19. The image sensor of claim 17, wherein the control circuit is further configured to calculate first norms of differences between the color value of the first pixel and the color values of the neighboring pixels, to calculate second norms of differences between the third transformed color value and the fourth transformed color values, and to determine the noise amplification degree for the color value of the first pixel using the first norms and the second norms.

20. The image sensor of claim 17, wherein the control circuit is further configured to apply the processed noise amplification degrees to a guide image filter, and to perform guide image filtering on the generated initial color transformed image using at least one of the raw image or the luminance information as a guide image of the guide image filter.

* * * * *